United States Patent Office 3,448,242
Patented June 3, 1969

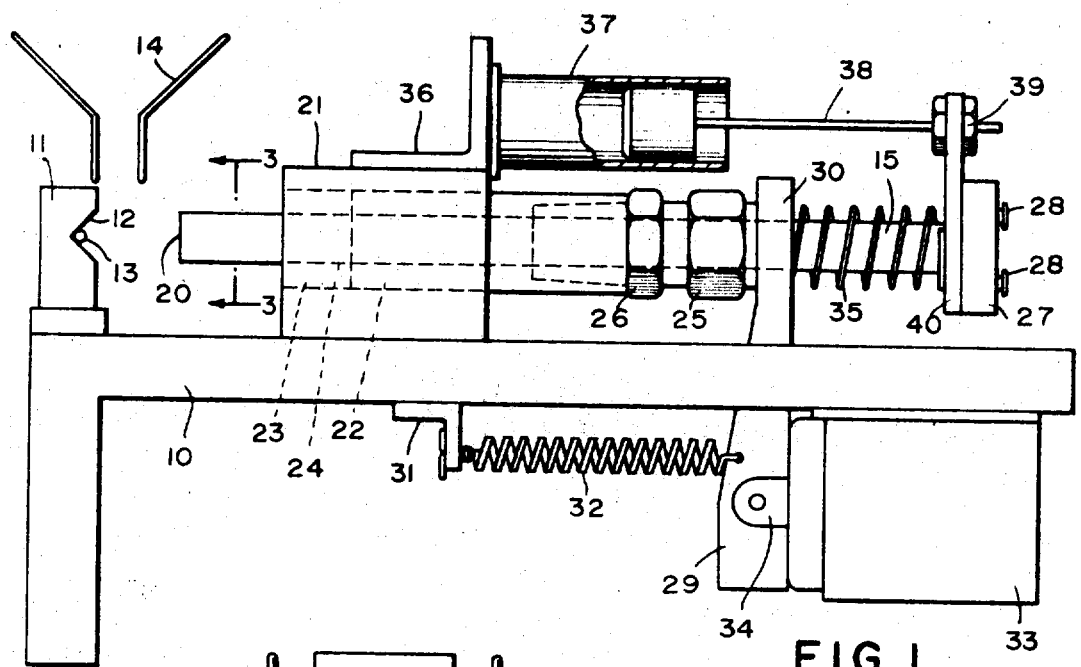
FIG. 1
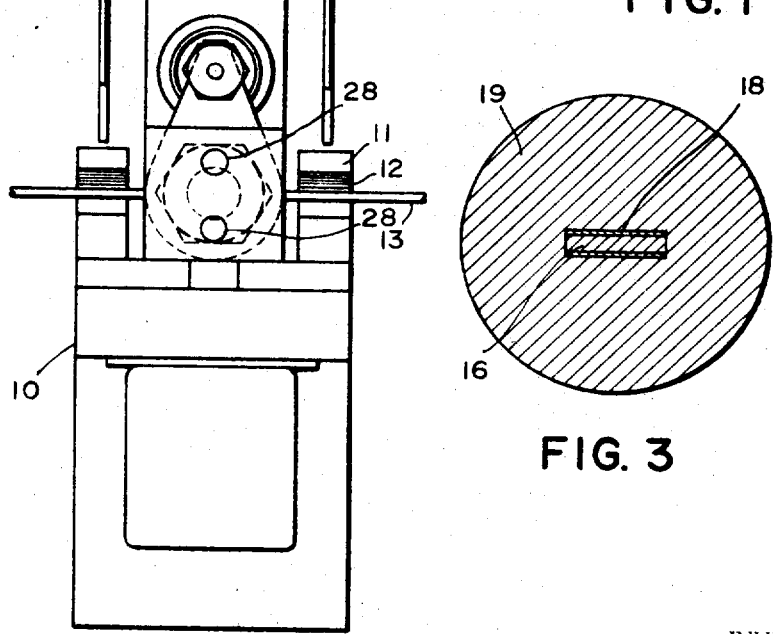
FIG. 2
FIG. 3
INVENTORS
COLIN W. LEATH
MYRON R. WALDMAN
ATTORNEY

3,448,242
WIRE HEATER TEMPERATURE CONTROL DEVICE
Myron R. Waldman, Providence, and Colin W. Leath, Centredale, R.I., assignors to Walco Electric Company, Providence, R.I., a corporation of Rhode Island
Filed June 13, 1966, Ser. No. 556,944
Int. Cl. G01k *1/16;* C21d *9/62*
U.S. Cl. 219—155                                    7 Claims

ABSTRACT OF THE DISCLOSURE

This device is applicable to wire heating devices. The electrically heated wire is passed across a base having spaced guides. A thermocouple is horizontally mounted on a support and is biased toward the wire in contact therewith. This allows for the frictional erosion of the thermocouple. A solenoid is used to withdraw the thermocouple from contact and to allow contact when the thermocouple is deactivated.

---

Our present invention relates to wire heating devices and more particularly to a sensing and control mechanism for a wire heating device.

The principal object of the present invention is to provide a method and means of sensing the temperature of a moving wire and for controlling the temperature while it is so moving.

Another object of the present invention is to provide a control for a heated wire passing through a preheating device.

A further object of the present invention is to provide a sensing head for a thermocouple assembly which is designed to erode with the friction of contact with a moving wire and which provides a constant tension of the sensing head on the hot moving wire.

Another object of the present invention is to provide a sensing and control device suitable for a preheater or for an annealing unit.

A further object of the present invention is to provide a sensing head and temperature control unit for a heated wire which is simple in construction and easy and economical to manufacture and assemble.

With the above and other objects and advantageous features in view, our invention consists of a novel arrangement of parts more fully disclosed in the detailed description following, in conjunction with the accompanying drawings, and more particularly defined in the appended claims.

In the drawings:

FIG. 1 is a side elevation, partly in section, of a temperature sensing head embodying our present invention.

FIG. 2 is an end view of the same taken from the rear of the head.

FIG. 3 is an enlarged section taken on line 3—3 on FIG. 1.

Figure 4:
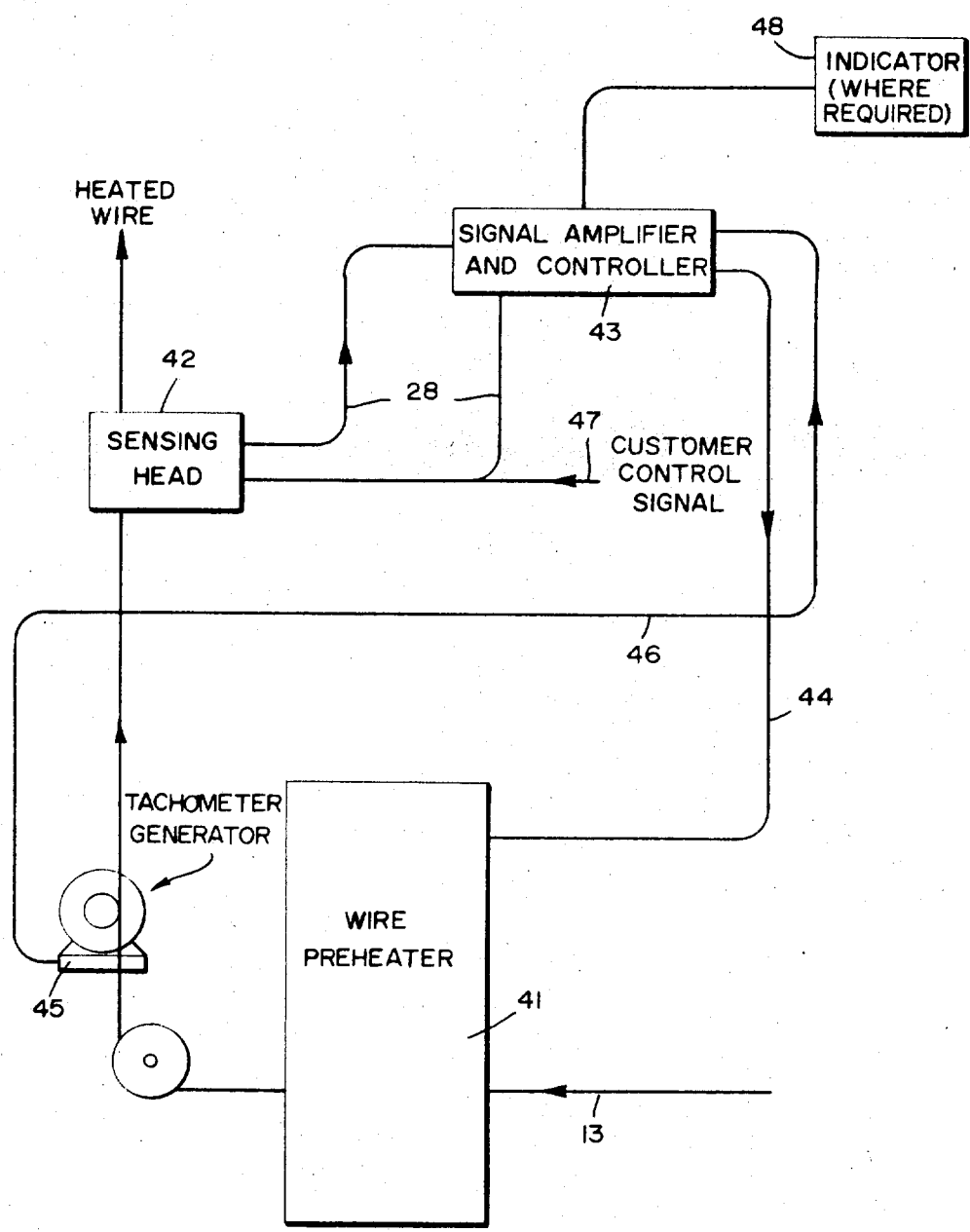
FIG. 4 is a wiring diagram of the control unit.

The present invention has particular adaptability for use with a brushless wire preheater illustrated in Peltier Patent No. 3,117,209, issued Jan. 4, 1964. In the manufacture of electrical conductor wire, it has been customary to cover the wire with a plastic material as a substitute for the conventional rubber cover heretofore used. To permit proper setting of the plastic material over the copper wire it is necessary that the wire be heated to approximately the temperature of the plastic material so that both will cool together. This requires that the copper wire be preheated before entering the coating die to temperatures of between 250 to 300 degrees Fahrenheit. The device illustrated in the patent above referred to is used for this purpose. However, since there are variations in the speed of the particular die and also variable controls are provided in the coating device, it is essential that some method of controlling the heat be also provided else the wire will either be underheated or overheated and possibly burnt out. The present invention thus provides a control device coupled with a sensing head for reading the temperature of the wire and adapted to maintain this temperature during the various speeds of operation. The device shown in the above patent can also be used for the purpose of annealing an aluminum wire. In such cases the temperatures involved range between 500 and 700 degrees F. Since the annealing temperatures are more critical than preheating of copper wire, it is essential that some form of control be utilized to maintain the proper temperature at whatever speed the wire is being run. Therefore, while the device of the present invention is applicable to both preheating and annealing it is particularly advantageous during the annealing operation.

Electronic circuit controls are not difficult to arrange, and the heart of the present invention is the sensing head which permits accurate reading of the high temperature in the moving wire. Attempts have been made to utilize other types of instrument for this purpose, but applicants have found that an accurate reading can only be made with a direct contact with the wire. Referring more in detail to the drawings, FIGS. 1 to 3 inclusive illustrate the construction using a sensing device which directly contacts the moving wire. Mounted at one end, the left end in FIG. 1, of a base 10 are a pair of spaced blocks 11 of ceramic material each having a V-shaped cutout 12 in its face for receiving the wire 13 passing therethrough. The use of ceramic material permits a smooth surface offering the least resistance to the passage of the wire 13 together with its ability to withstand the heat of the wire. Mounted above and in front of the blocks 11 are a pair of wire insertion guides 14 forming a Y-shape so that the wire can quickly and easily be inserted in the blocks.

The sensing head 15 is constructed as illustrated in FIGS. 1 and 3. A strip of mica 16 is provided at one side with a strip of iron 17 and on the opposite side with a strip of metal comprising a copper and nickel mixture 18 which is known in the trade as constantan. These by-metallic elements form a thermocouple. The unit is embedded in an asbestos-phenolic body 19. When the front end 20 is in contact with the moving heated wire 13, an eroding action occurs so that the metal particles of the metals bridging across the gap formed by the mica forms a "ground weld" to provide the necessary temperature reading. The body 19 and the thermocouple may thus erode under the constant friction of the moving wire, however the continued contact under a constant pressure, as hereinafter described, permits an uninterrupted and accurate reading of the temperature.

The temperature sensor is mounted for horizontal movement by means of a block 21 mounted on a base rearwardly of the wire 13 and provided with an enlarged bore 22 of greater diameter than the sensor head. A smaller block 23 is mounted at the front end of the bore 22 and is provided with a central bore 24 adapted to receive the sensor and to hold it in proper position. Extending rearwardly the sensor is surmounted by an assembly 25 adapted to conventionally grip the elongated sensor 15 and frictionally adjust its forward movement by movement of the member 26. The sensor 15 extends rearwardly and terminates in a dielectric block 27 having the cord lead connections 28 for receiving the signal.

Movement of the sensor 15 forwardly against the wire 13 is accomplished by the construction further illustrated in FIG. 1. A vertical operating arm 29 is provided with a forked upper end 30 which surrounds the sensor 15 behind the assembly 25. The vertical arm 29 extends through a suitable slot in the base 10 (not shown). Mounted beneath the base 10, forwardly of the arm 29 is a bracket 31. A negator spring 32 is mounted with one end locked in the bracket 31 and the opposite end attached to the vertical arm 29. The negator spring provides a constant force pulling the arm 29 forwardly so that its upper end 30 pushes the assembly 25 and the sensor frictionally grasped by the member 26 forwardly against the wire 13. The characteristics of the spring 32 are such that regardless of the position, a constant force is exerted by the spring. As a result, as the front end 20 of the sensor wears away, pressure of the sensor 15 on the moving wire 13 will always be constant. Retraction of the sensor is controlled by a solenoid 33 mounted beneath the base 10 to the right in FIG. 1. The solenoid 33 is provided with an operating arm 34 tightly mounted at the vertical arm 29. A coil spring 35 surrounds the sensor head 15 between the upper end 30 of the arm 29 and the rear assembly of the sensor head. In addition to the foregoing, a bracket 36 is mounted on the block 21 and an electrically regulated air pot 37 is mounted thereon with its piston arm 38 locked at 39 to a vertical plate 40 surrounding the rear of the sensor 15 between the end block 27 and the spring 35.

With the parts thus assembled, it is obvious that the function of the spring 35 and the dash pot 37 is to prevent violent and rapid movements of the sensor 15. In the position illustrated in FIG. 1, the solenoid 33 has retracted so that the front end 20 of the sensor 15 is away from the wire 13 and the spring 32 has been stretched. Now when it is desired to move the sensor forwardly against the wire, the current in the solenoid 33 is released and the spring 32 then takes over and moves the arm 29 to the left which in turn causes its top forked end 30 to move the assembly 25 and slide the sensor 15 through the block 23 until it touches the wire 13. This movement is controlled by the dash pot 37 to prevent a quick and violent snap of the sensor head against the wire. The action is slow. Conversely, when it is desired to withdraw the sensor head, the solenoid 33 is actuated and its arm 34 tends to pull the operating arm 29 to the right against the action of the spring 32. This action may be quite rapid. However, since the only connection at this point between the upper part of the arm 30 and the sensor head 15 is through the spring 35 the quick action of the solenoid 33 results in a fast compression of the spring 35 and then a slow movement of the assembly outwardly into the position shown in FIG. 1 against the slowing action of the dash pot 37. Thus the combination of the spring 35 and the dash pot 37 controls the reciprocation of the sensor head 15. In either direction the action cannot be too fast.

The pressure of the spring 32 causing the pressure of the sensor 15 on the wire 13 is of course predetermined by the spring itself. Applicants have found that an extremely light touch gives a variety of readings whereas a heavier pressure increases the accuracy of the readings but also increases the heat of friction between the sensor head end 20 and the wire. After experimentation, applicants have found that an ideal pressure is that between three and five ounces. At this pressure the reading is accurate and the friction caused by contact is negligible.

Now referring to FIG. 4, the method of use of the sensing device illustrated in FIGS. 1 to 3 inclusive becomes apparent. A conventional wire preheater 41 is mounted so that the wire 13 passes therethrough in the direction of the arrows. The heated wire passes through the sensing device 42 which sends a signal to the connections 28 to a signal amplifier and controller 43. This automatically controls the current in the preheater through a line 44. Thus the temperature of the wire can automatically be set and controlled through the sensing head 42 and signal amplifier and controller 43. In annealing, the speed of the wire may also be a factor and the tachometer generator 45 may be used to sense the speed of the wire and signal through the line 46 to the signal amplifier and controller 43. Thus the control could be a combination of speed and temperature. A customer control signal 47 can be imposed for moving the solenoid manually. Where required, the signal amplifier and controller can be equipped with an indicator 48 for indicating temperature or speed or both.

Therefore, by the use of the novel sensing head arrangement illustrated in FIGS. 1 and 3, and the simple hookup illustrated in FIG. 4, an accurate and fine control can be maintained on the heat and speed of the wire either for preheating or for annealing. Because of the condition of the sensor head in direct contact with the wire accurate reading can be maintained. Other advantages of the present invention will be readily apparent to a person skilled in the art.

We claim:

1. In a system for measuring and controlling the temperature of an electrically heated moving wire, a base, spaced guides on said base for guiding the heated wire transversely across said base, a support mounted on said base and having a horizontal bore, an elongated thermocouple mounted in said bore and having a sensing end and cord lead wires at the opposite end for conveying the temperature reading, said thermocouple comprising a ribbon of iron and a ribbon of a copper-nickel alloy separated by a ribbon of mica, said metallic and mica ribbons being embedded in an asbestos-phenolic body, said ribbons and body eroding with the frictional contact with said wire, and means for reciprocating said thermocouple axially toward and away from the heated wire, said means maintaining said sensing end against said wire between said guides, said means comprising a solenoid mounted beneath said base, an operating arm extending from said solenoid to said thermocouple through a slot in said base, said solenoid being activated to withdraw said thermocouple from the wire, a bracket mounted beneath said base, and a spring between said bracket and said solenoid operating arm for maintaining said thermocouple in contact with the wire when said solenoid is deactivated.

2. The system as in claim 1, wherein said spring is a constant pressure negator spring for maintaining said thermocouple against the wire with a predetermined constant pressure.

3. The system as in claim 1, wherein a coil spring surrounds the rear portion of said thermocouple and said solenoid operating arm bears against said spring for absorbing the shock of the movement of said arm when said solenoid is activated.

4. The system as in claim 1, wherein a dash pot is mounted on said support, and the outer end of the piston rod of said dash pot is linked to the rear of said thermocouple for slowing and controlling the reciprocating movement of said thermocouple.

5. The system as in claim 2, wherein a coil spring surrounds the rear portion of said thermocouple and said solenoid operating arm bears against said spring for absorbing the shock of the movement of said arm when said solenoid is activated.

6. The system as in claim 5, wherein a dash pot is mounted on said support, and the outer end of the piston rod of said dash pot is linked to the rear of said thermocouple for slowing and controlling the reciprocating movement of said thermocouple.

7. The system as in claim 4, wherein a coil spring surrounds the rear portion of said thermocouple and said reciprocating means bears against said spring for absorbing the shock of movement of said means.

References Cited

UNITED STATES PATENTS

| | | | |
|---|---|---|---|
| 846,998 | 3/1907 | Hammond | 73—359 X |
| 2,019,555 | 11/1935 | Wood et al. | 219—155 |
| 2,025,015 | 12/1935 | Byrns | 136—230 |
| 2,379,317 | 6/1945 | Picciano | 136—229 X |
| 2,466,137 | 4/1949 | Vollrath | 73—359 X |
| 2,773,161 | 12/1956 | Baker | 219—155 X |
| 2,839,594 | 6/1958 | Schneidersmann | 136—229 |
| 2,988,582 | 6/1961 | McGregor et al. | 136—221 |

RICHARD M. WOOD, *Primary Examiner.*

B. A. STEIN, *Assistant Examiner.*

U.S. Cl. X.R.

136—221; 219—50, 110